United States Patent Office 2,978,979
Patented Apr. 11, 1961

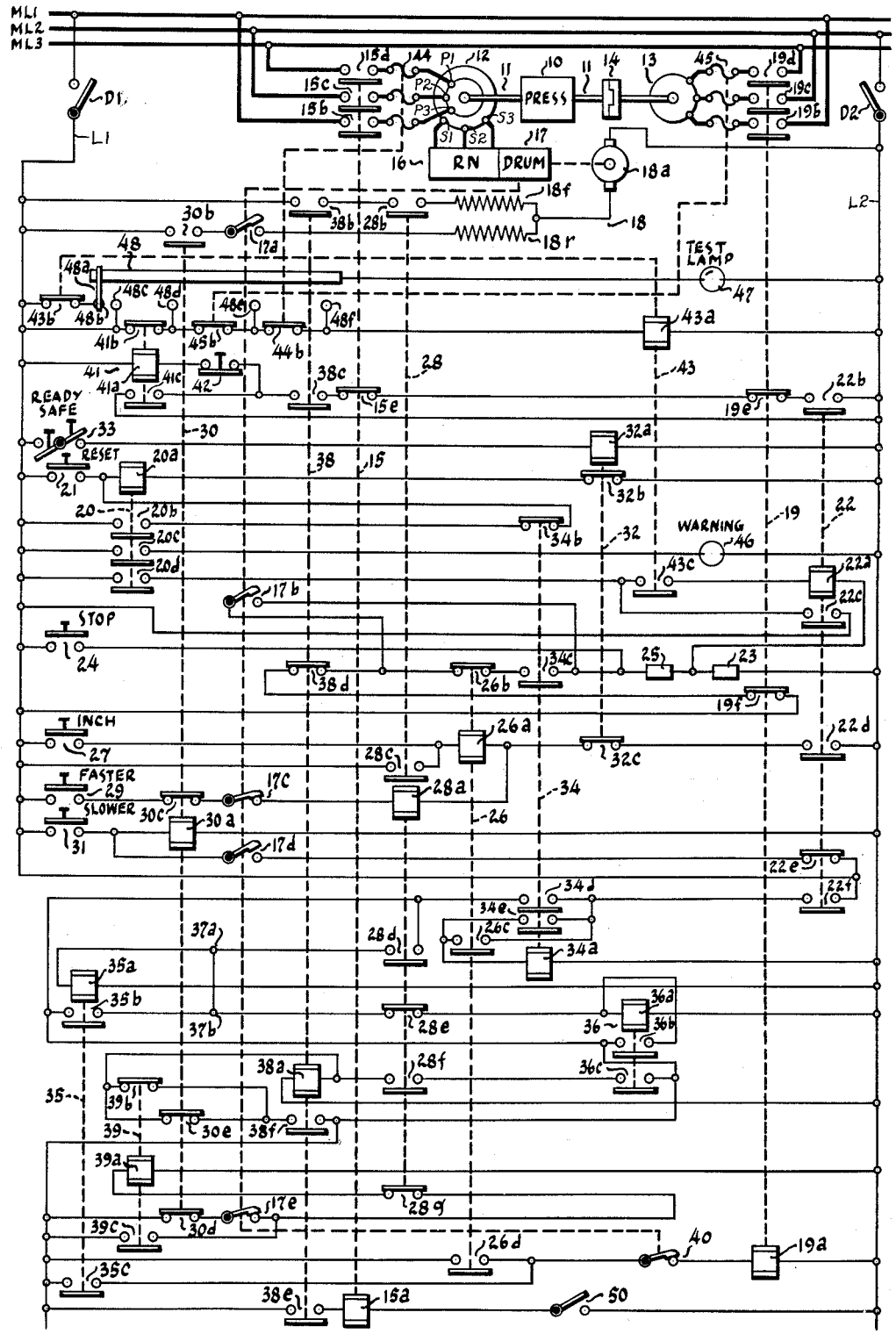

2,978,979

CONTROL SYSTEM FOR PRINTING PRESS

William H. Rouse, Brookfield, Wis., assignor to Cutler-Hammer, Inc., Milwaukee, Wis., a corporation of Delaware Filed Aug. 15, 1958, Ser. No. 755,356

16 Claims. (Cl. 101—219)

This invention relates generally to improvements in electrical motor controllers. While not limited thereto, the invention relates particularly to controllers for graphic arts machinery such as printing presses and the like.

It is sometimes necessary to operate a printing press at speeds ranging from twenty-five percent to one hundred percent of full speed when printing and to operate it at a speed as low as two and one-half percent of full speed for threading and inching. Some presses are driven by an A.C. constant voltage main motor in the printing speed range and by another motor at the threading and inching speed. Speed changes of the main motor are effected by commutation of the secondary resistance thereof by means of a drum controller operated by a pilot motor and forward and reverse movement of the drum also effects transfer of operation from the threading motor to the main motor, or vice-versa. In such installation, the pilot motor operates in response to actuation of switches designated "Faster" and "Slower" and the operator depends on "feel" to differentiate between threading speed and printing speed. However, if threading speed is desired, prolonged actuation of the "Faster" switch carries the press out of the threading speed range and into the printing speed range. Conversely, if slow printing speeds are desired, prolonged actuation of the "Slower" switch carries the press out of the printing speed range and into the threading speed range. It is desirable, therefore, to provide an improved controller for the threading motor and main motor which overcomes the aforementioned and other difficulties and which has other advantages.

Accordingly, it is an object of this invention to provide an improved controller whereby initial actuation of the "Faster" switch effects operation of the threading motor and subsequent actuation of the "Faster" switch is necessary to effect operation of the main motor, to raise its speed and to stop the threading motor, and whereby initial actuation of the "Slower" switch effects lowering of the speed of the main motor and subsequent actuation thereof, when the main motor is at its lowest speed is necessary to effect reoperation of the threading motor and to stop the main motor.

Another object is to provide an improved controller of the aforesaid character which performs other control functions which will hereinafter appear.

Other objects and advantages of the invention will hereinafter appear.

The accompanying drawing illustrates a preferred embodiment of the invention, it being understood that the embodiment shown is susceptible of changes with respect to detail thereof without departing from the scope of the appended claims.

Referring to the drawing, the numeral 10 designates a printing press having a shaft 11 which is adapted to be driven by a main motor 12 or by a threading and inching motor 13. Main motor 12 is permanently coupled to shaft 11 and is adapted to drive the press at printing speeds which may range from twenty-five to one hundred percent of full speed. Threading motor 13, which is coupled to shaft 11 by a clutch 14 is adapted to drive the press at a speed of about two and one-half percent of full speed. Clutch 14 may be of the so-called "overrunning" type and is adapted to uncouple motor 13 from shaft 11 when the shaft is being driven by main motor 12 at a predetermined speed greater than the normal speed of motor 13 shortly before motor 13 is deenergized as will hereinafter appear. It will be understood, however, that other types of clutch apparatus, such as for example, an electroresponsive clutch may be employed if desired.

There is also provided a suitable source of A.C. power supply comprising the supply lines ML1, ML2 and ML3 and two supply lines L1 and L2 are connectable to lines ML1 and ML2, respectively, through the normally open contacts of the disconnect switches D1 and D2, respectively.

The primary terminals P1, P2 and P3 of main motor 12 are connectable to lines ML1, ML2 and ML3 through the normally open contacts 15b, 15c and 15d, respectively, of a main motor contactor 15 whenever the latter is energized. The operating coil 15a of contactor 15 is connected on one side to line L2 through a normally open disconnect switch 50 and is connectable on its other side to line L1 through a normally open contact 38e of a main relay 38, a normally open contact 34d of a "safe after inch" or SAI relay 34, and a normally open contact 22f of a stop relay 22. It is to be understood that disconnect switch 50 is representative of a multiplicity of disconnect and test switches which are employed in the actual embodiment of the invention which must be closed before the coil 15a of main contactor 15 can be energized. If any of such switches are inadvertently open, main contactor 15 will not energize to open contact 15e before contact 19e closes in response to deenergization of contactor 19. As will hereinafter appear, when this happens main failure relay 41 will energize and operation of test switch 48 will indicate, therefore, that switch 50 has not been closed.

The secondary terminals S1, S2 and S3 of main motor 12 are connected to a suitable resistance network 16 comprising resistors (not shown) which may be assumed to be commutated by certain switches (not shown) of a drum controller 17. Drum controller 17 is movable in steps through a number of speed points in either the forward or reverse direction by a pilot motor 18 to increase or decrease the speed of main motor 12. Drum controller 17 also operates six limit switches as follows. When the drum is on its lowest speed point limit switches 17a, 17b and 17d are open and 17c, 17e and 40 are closed; when the drum is on its second from lowest speed point all limit switches except 17e are closed; when the drum is on its third from lowest speed point (or any point thereafter except the highest speed point) all limit switches except 17e and 40 are closed; and when the drum is on its highest speed point the limit switches 17a, 17b and 17d are closed and 17c, 17e and 40 are open. One side of the armature 18a of pilot motor 18 is connected to line L2 and the other side thereof is connectable to line L1 either through a forward field winding 18f, a normally open contact 28b of a faster relay 28 and a normally open contact 38b of a main relay 38 for operation in the forward direction, or through a reverse field winding 18r, the normally open contact of limit switch 17a and a normally open contact 30b of a slower relay 30 for operation in the reverse direction.

Threading motor 13 is connectible to lines ML1, ML2 and ML3 through the normally open contacts 19b, 19c and 19d, respectively, of a threading motor contactor 19 whenever the latter is energized. The operating coil 19a of contactor 19 is connected on one side to line L2 and is connectible on its other side to line L1 through the normally closed contact of limit switch 40, a normally open contact 26d of an inch relay 26, contact 34d of SAI relay 34 and contact 22f of stop relay 22. A normally open contact 35c of a run relay 35 is connected across contact 26d.

The operating coil 32a of a safe relay 32, which must be deenergized in order to operate the controller, is connected on one side to line L2 and is connectible on its other side to line L1 through a normally open contact 33 of a Ready-Safe toggle switch.

The operating coil 43a of a protect relay 43, which must be energized before the controller can operate, is connected on one side to line L2 and is connectible on its other side to line L1 through the normally closed contacts 44b and 45b of overload responsive devices 44 and 45 for main motor 12 and thread motor 13, respectively, and through a normally closed contact 41b of a main failure relay 41.

The operating coil 41a of main failure relay 41, which must be deenergized in order for the controller to operate, is connected on one side to line L1 and is connectible on its other side to line L2 through a normally closed contact of a main failure reset pushbutton switch 42, a normally open contact 38c of a main relay 38, a normally closed contact 15e of main motor contactor 15, a normally closed contact 19e of thread motor contactor 19 and a normally open contact 22b of stop relay 22. A normally open contact 41c of main failure relay 41 is connected across contactor 38c, 15e, 19e and 22b. Main failure relay 41 energizes only in the event that stop relay 22 and main relay 38 are energized to close contacts 22b and 38c, respectively, and contact 15e fails to open before contact 19e closes. Failure of contact 15e to open indicates that main contactor 15 has failed to energize. In most instances such failure is attributable to the fact that disconnect switch 50 is unintentionally open. If the main failure relay energizes upon the aforesaid event, its contact 41c closes to maintain it energized and its contact 41b opens to deenergize protect relay 43. Main failure relay 41 is deenergized by depression of pushbutton switch 42 to interrupt its energizing circuit.

The controller is also provided with a test indicator lamp 47 which is connected on one side to line L2 and is connected on its other side to the movable contact member 48a of a test selector switch 48 which is provided with five taps. When the controller is ready for operation the lamp is energized upon movement of member 48a to any of the taps. If lines L1 and L2 are energized, illumination of the lamp on tap 48b indicates that protect relay 43 is deenergized and its contact 43b is closed; failure to light on tap 48c indicates that the lamp is defective; failure to light on tap 48d indicates that the main failure relay 41 is energized and contact 41b is open; and failure to light on taps 48e or 48f indicates that either motor overload device 45 or 44 has tripped and that contacts 45b or 44b, as the case may be, is open.

The controller is also provided with a warning signal device 46, such as a buzzer or bell, which is energizable to indicate that the press is ready to be operated, i.e., whenever the reset relay 20 is energized. One side of device 46 is connected to line L2 and the other side is connected to line L1 through a normally open contact 20c of reset relay 20.

The operating coil 20a of reset relay 20 is connectible on one side to line L1 through a normally open contact 21 of a Reset pushbutton and is connectible on its other side to line L2 through a normally closed contact 32b of safe relay 32. A normally open contact 20b of reset relay 20 is connected in series with a normally closed contact 34b of SAI relay 34 across contact 21 to maintain reset relay 20 energized until the SAI relay energizes.

The operating coil 22a of stop relay 22, which must be energized before relays 34, 35, 36, 38, 39 and contactors 15 and 19 can be energized, is connectible on one side to line L1 through a normally open contact 43c of protect relay 43 and a normally open contact 20d of reset relay 20 and is connectible on its other side to line L2 through a resistor 23. A normally open maintaining contact 22c of stop relay 22 is connected across contact 20d to maintain stop relay 22 energized after the reset relay deenergizes in response to energization of the SAI relay 34. A normally open contact 24 of a Stop pushbutton switch is connected in series with a resistor 25 between line L1 and a point between stop relay coil 22a and resistor 23. Closure of contact 24 effects deenergization of stop relay 22 and when stop relay contact 22f opens any of the relays and the contactor connectible therethrough to line L1 deenergize if they are energized. Thus, thread motor 13 and/or main motor 12 will be deenergized upon depression of the Stop pushbutton. The Reset button must be depressed after each operation of the Stop button before the press can be operated again. The normally closed contacts 19f, 38d and 26b of contactor 19, main relay 38 and inch relay 26, respectively, and a normally open contact 34c of SAI relay 34 are connected in series with each other across contact 24. The normally open contact of limit switch 17b is connected across contacts 26b and 34c.

The operating coil 34a of SAI relay 34 is connected on one side to line L2 and is connectible on its other side to line L1 through a normally open contact 26c of an inch relay 26 and contact 22f of stop relay 22. A normally open contact 34e of SAI relay 34 is connected across contact 26c to maintain the relay 34 energized after it energizes in response to energization of the inch relay 26.

The operating coil 26a of inch relay 26 is connectible on one side to line L1 through the normally open contact 27 of an Inch pushbutton switch and is connectible on its other side to line L2 through a normally closed contact 32c of safe relay 32 and a normally open contact 22d of stop relay 22. A normally open contact 28c of a faster relay 28 is connected across contact 27. Thus, assuming that safe relay 32 is deenergized and stop relay 22 is energized, inch relay 26 is energizable in response to depression of the Inch button or to energization of the faster relay 28.

The operating coil 28a of faster relay 28 is connectible on one side of line L1 through a normally open contact 29 of a Faster pushbutton switch, a normally closed contact 30c of a slower relay 30 and the normally closed contact of limit switch 17c and is connectible on its other side to line L2 through contacts 32c and 22d.

The operating coil 30a of a slower relay 30 is connectible on one side to line L1 through a normally open contact 31 of a Slower pushbutton switch and is connected on its other side to line L2. A normally closed contact 22e of stop relay 22 is connected in series with the normally open contact of limit switch 17d across contact 31.

The operating coil 35a of a run relay 35 is connected on one side to line L2 and is connectible on its other side to line L1 through a normally open contact 28d of faster relay 28, a normally open contact 34d of SAI relay 34 and contact 22f.

The operating coil 36a of an advance relay 36 is connected on one side to line L2 and is connectible on its other side to line L1 through a normally closed contact 28e of faster relay 28, a normally open contact 35b of run relay 35, contact 34d and contact 22f. A connection extends between the points 37a and 37b. A normally open contact 36b of advance relay 36 is connected across contacts 35b and 28e to maintain advance relay 36 energized when closed. The operating coil 38a of a main relay 38 is connected on one side to line L2 and is connectible on its other side to line L1 through a normally open contact 28f of faster relay 28, a normally open contact 36c of advance relay 36, contact 34d and contact 22f. A normally closed contact 30e of slower relay 30 and a normally open contact 38f of main relay 38 are connected in series across contacts 28f and 36c. A normally closed contact 39b of a slowdown relay 39 is connected across contact 30e.

The operating coil 39a of slowdown relay 39 is connected on one side to line L2 and is connectible on its other side to line L1 through a normally closed contact 28g of faster relay 28, the normally closed contact of limit switch 17e, a normally closed contact 30d of slower relay 30, contact 34d and contact 22f. A normally open contact 39c of slowdown relay 39 is connected across contact 30d and the contact of limit switch 17e.

The controller operates as follows:

Assume that lines ML1, ML2 and ML3 are energized, that all overload protective devices are untripped, that drum controller 17 is on its lowest speed point, that contact 33 of the Ready-Safe switch is open thereby maintaining safe relay 32 deenergized, that member 48a of test switch 48 is on tap 48b and that the switches represented by disconnect switch 50 are closed.

Closure of disconnect switches D1 and D2 energizes lines L1 and L2 and an energizing circuit for protect relay 43 is established from line L1 to L2 through contacts 41b, 45b and 44b and coil 43a. Energization of protect relay 43 effects opening of contact 43b to extinguish test lamp 47 and closure of contact 43c with no immediate effect. Depression of the Reset button establishes an energizing circuit for reset relay 20 from line L1 to L2 through contacts 21 and 32b and coil 20a. Energization of reset relay 20 effects closure of contact 20b which maintain reset relay 20 energized, closure of contact 20c which energizes warning signal device 46, and closure of contact 20d which establishes an energizing circuit for stop relay 22 from line L1 to L2 through contact 20d, contact 43c, coil 22a and resistor 23. Energization of stop relay 22 effects closure of contacts 22b, 22d and 22f with no immediate effect, closure of contact 22c which maintains stop relay 22 energized, and opening of contact 22e with no immediate effect. The press is now ready to be operated.

To inch the press, the Inch button is depressed thereby establishing an energizing circuit for inch relay 26 from line L1 to L2 through contact 27, coil 26a and contacts 32c and 22d. Energization of inch relay 26 effects opening of contact 26b with no immediate effect, closure of contact 26d with no immediate effect, and closure of contact 26c which establishes an energizing circuit for SAI relay 34. Energization of SAI relay 34 effects opening of contact 34b which deenergizes reset relay 20 with no immediate effect other than to deenergize warning device 46, closure of contact 34c with no immediate effect, closure of contact 34d which establishes an energizing circuit for thread motor contactor 19 from line L1 to L2 through contacts 22f, 34d, 26d, the contact of limit switch 40 and coil 19a, and closure of contact 34e which maintains SAI relay 34 energized. Closure of contact 34d also establishes an energizing circuit for slowdown relay 39 (which has no effect at this time). Energization of container 19 effects closure of contacts 19b, 19c and 19d to connect thread motor 13 to lines ML1, ML2 and ML3, respectively, for operation and opening of contacts 19e and 19f with no immediate effect. Thread motor 13 drives the press until the Inch button is released to effect deenergization of inch relay 26. Upon deenergization of relay 26 contact 26b closes with no immediate effect, contact 26c opens with no immediate effect and contact 26d opens to deenergize contactor 19. Upon deenergization of contactor 19 contacts 19b, 19c and 19d open to stop motor 13, contact 19e closes with no immediate effect, and contact 19f closes to effect deenergization of stop relay 22 by establishing a circuit from line L1 to L2 through contacts 19f, 38d, 26b, 34c and resistors 25 and 23. Upon deenergization of stop relay 22 contacts 22b, 22c and 22d open with no immediate effect, contact 22e closes with no immediate effect, and contact 22f opens to effect deenergization of SAI relay 34 and deenergization of slowdown relay 39. Before the press can be operated again, the Reset button must be depressed to energize reset relay 20 and stop relay 22, as hereinbefore described.

To run the press at threading speed, the Faster button is momentarily depressed thereby establishing an energizing circuit for faster relay 28 from line L1 to L2 through contacts 29 and 30c, the contact of limit switch 17c, coil 28a and contacts 32c and 22d. Energization of faster relay 28 effects closure of contacts 28b, 28d and 28f with no immediate effect, opening of contacts 28e and 28g with no immediate effect, and closure of contact 28c which energizes inch relay 26 by establishing a circuit from line L1 to L2 through contact 28c, coil 26a, contacts 32c and 22d. Energization of inch relay 26, as hereinbefore described, effects energization of SAI relay 34. Energization of relay 34 effects opening of contact 34b which deenergizes reset relay 20, as hereinbefore described, closure of contact 34e which maintains SAI relay 34 energized, closure of contact 34c with no immediate effect, and closure of contact 34d which establishes an energizing circuit for thread motor contactor 19 and motor 13 as hereinbefore described. Closure of contact 34d also establishes an energizing circuit for run relay 35 from line L1 to L2 through contact 22f, contact 34d, contact 28d and coil 35a. Energization of run relay 35 effects closure of contact 35b which maintains relay 35 energized and closure of contact 35c with no immediate effect. Upon release of the Faster pushbutton thread motor 13 continues to operate. Contact 29 opens to deenergize faster relay 28 whose contacts 28b, 28d and 28f open with no immediate effect, whose contact 28e closes to establish an energizing circuit for advance relay 36a from line L1 to L2 through contacts 22f, 34d, 35b, 28e and coil 36a, whose contact 28c opens to deenergize inch relay 26 with no immediate effect (since contactor 19 is energized through contact 35c), and whose contact 28g closes to effect energization of slowdown relay 39 with no immediate effect. Energization of advance relay 36 effects closure of contact 36b which maintains relay 36 and closure of contact 36c with no immediate effect.

To advance the press into the printing speed range the Faster button is redepressed thereby establishing an energizing circuit for faster relay 28 as hereinbefore described. Energization of faster relay 28 effects closure of contacts 28b and 28d with no immediate effect, closure of contacts 28c which energizes inch relay 26 as hereinbefore described but with no immediate effect, opening of contact 28e with no immediate effect, closure of contact 28f which effects energization of main relay 38 by establishing a circuit from line L1 to L2 through contacts 22f, 34d, 36c and 28f and coil 38a, and opening of contact 28g to effect deenergization of slowdown relay 39 with no immediate effect. Energization of main relay 38 effects closure of contact 38b which connects pilot motor 18 for forward operation by establishing a circuit from line L1 to L2 through contacts 38b and 28b, field winding 18f and armature 18a, closure of contacts 38c and 38f with no immediate effect, opening of contact 38d with no immediate effect, and closure of contact 38e to effect energization of main contactor 15 by establishing a circuit from line L1 to L2 through contact 22f, contact 34d, contact 38e and coil 15a. Energization of main contactor 15 effects closure of contacts 15b, 15c and 15d to energize main motor 12 and opening of contact 15e with no immediate effect. At this point the press is being driven by main motor 12 and thread motor 13 is idling. If the second operation of the Faster button is momentary, the press will accelerate on the main motor 12 to minimum printing speed, approximately 25% of maximum printing speed. The shaft 11, now being driven by motor 12 reaches a speed which causes the overrunning type clutch 14 to disengage motor 13 from shaft 11.

If, instead of being pressed momentarily, the Faster button is held down, the pilot motor 18 will rotate in the forward direction to reduce the secondary resistance in the main motor circuit thereby increasing the speed of main motor 12 and will operate the limit switches as hereinbefore described. As drum controller 17 moves from the second to the third from lowest speed point limit switch 40 opens to deenergize thread contactor 19 thereby effecting disconnection of thread motor 13 from lines L1, L2 and L3. When the Faster button is released, contact 29 opens to effect deenergization of faster relay 28. Contact 28b opens to deenergize pilot motor 18 and main motor 12 operates at a speed determined by the position in which drum 17 comes to rest. Contact 28c opens to deenergize inch relay 26 with no immediate effect, contacts 28d and 28f open with no immediate effect and contacts 28e and 28g close with no immediate effect. To increase the speed of the press the Faster button is depressed to energize the faster relay 28 with the results hereinbefore described. If the Faster button were maintained depressed so that pilot motor 18 carried the drum controller 17 to its highest speed point, limit switch 17c would open to effect deenergization of faster relay 28 with the same result as if the Faster button were released.

To slow the press, the Slower button is depressed thereby establishing an energizing circuit for slower relay 30 from line L1 to L2 through contact 31 and coil 30a. Energization of slower relay 30 effects closure of contact 30b which connects pilot motor 18 for reverse operation by establishing a circuit from line L1 to L2 through contact 30b, the contact of limit switch 17a, field winding 18r and armature 18a and opening of contacts 30c, 30d and 30e with no immediate effect. The pilot motor 18 rotates in the reverse direction to increase the secondary resistance in the main motor circuit thereby decreasing the speed of main motor 12. When the Slower button is released contact 31 opens to deenergize slower relay 30 and contact 30b opens to effect deenergization of pilot motor 18 and main motor 12 operates at a speed determined by the position in which drum controller 17 comes to rest. Contacts 30c, 30d and 30e close without immediate effect. If the Slower button is maintained depressed so that pilot motor 18 carries the drum controller into its second from lowest speed point, limit switch 40 closes to effect energization of thread contactor 19 by establishing a circuit from line L1 to L2 through contacts 22f, 34d and 35c, the contact of limit switch 40 and coil 19a. Energization of contactor 19 effects operation of thread motor 13, as hereinbefore described, but clutch 14 does not permit it to drive shaft 11 until the speed of the latter reaches that of motor 13. If drum controller 17 moves into its lowest speed point the contact of limit switch 17a opens to deenergize pilot motor 18. If the Slower button is released with drum controller 17 in its lowest speed point, contact 31 opens to effect deenergization of slower relay 30 whose contact 30b opens with no immediate effect, whose contacts 30c and 30e close with no immediate effect, and whose contact 30d closes to establish an energizing circuit for slowdown relay 39 from line L1 to L2 through contact 22f, 34d and 30d, the contact of limit switch 17e, contact 28g and coil 39a. Energization of relay 39 effects opening of contact 39b with no immediate effect and closure of contact 39c which maintains slowdown relay 39 energized.

To slow the press to threading speed, the Slower button is depressed while drum controller 17 is on its lowest speed point thereby energizing slower relay 30 as hereinbefore described. Energization of relay 30 effects closure of contact 30b with no immediate effect, opening of contact 30c and 30d with no immediate effect, and opening of contact 30e which effects deenergization of main relay 38 whose contacts 38b, 38c and 38f open with no immediate effect, whose contact 38d closes with no immediate effect, and whose contact 38e opens to effect deenergization of main contactor 15. Deenergization of main contactor 15 effects deenergization of main motor 12 as hereinbefore described and reclosure of contact 15e without immediate effect. Upon release of the Slower button contact 31 opens to effect deenergization of relay 30 whose contacts operate with no immediate effect. At this point relays 43, 22, 34 and 39 and contactor 19 are energized and thread motor 13 is in operation.

It will be understood that the press, whether running at threading speed or printing speed, may be stopped by momentary depression of the Stop pushbutton to deenergize stop relay 22 whose contact 22f will open to effect deenergization of the relays and contactors energizable therethrough.

I claim:

1. In combination, a printing press adapted to run at a preselected constant threading speed and over a range of higher printing speeds, and a controller for said press, said controller comprising first and second control devices, means to run said press at said threading speed only upon initial operation of said first control device and to run said press at a printing speed upon the second operation of said first control device, said means further operable upon the third or subsequent operation of said first control device to increase the printing speed of said press, and means for decreasing the printing speed of said press to not lower than a predetermined minimum printing speed upon the initial operation of said second control device, said last mentioned means further operable upon a second or subsequent operation of said second control device when said press is running at said predetermined minimum printing speed to run said press at said threading speed.

2. The combination according to claim 1 wherein said controller includes means to automatically stop said press in the event that the latter fails to run at printing speed after the second operation of said first control device.

3. The combination according to claim 2 wherein said controller includes means for indicating whether or not the controller is in readiness for operation, said means adapted to indicate where a fault exists if the controller is not in readiness.

4. The combination according to claim 3 wherein said controller includes third and fourth control devices, means to run said press at threading speed for as long as said third control device is operated, and means to stop said press when running at either threading or printing speed when said fourth control device is operated.

5. In combination, a device, first and second motors for driving said device, first and second switches, means for effecting operation of said first motor upon the initial actuation of said first switch and for effecting operation of said second motor upon the next subsequent actuation of said first switch, said means further operable upon the second or subsequent actuation of said first switch to increase the speed of said second motor, means for effecting decrease in the speed of said second motor upon actuation of said second switch and for rendering said second motor inoperative upon subsequent actuation of said second switch when said second motor is operating at a predetermined low speed, and means for rendering said first motor inoperative and operative when said second motor is operating above and below a predetermined speed.

6. The combination according to claim 5 including means for temporarily rendering said switches ineffective to perform further control functions in the event that the aforesaid next subsequent actuation of said first switch fails to effect operation of said second motor before said first motor is rendered inoperative.

7. The combination according to claim 6 including means for indicating whether said switches have been temporarily rendered ineffective to perform further control functions and means for rendering said switches effective to again perform further control functions.

8. The combination according to claim 7 including third and fourth switches, means for effecting operation of said first motor for as long as said third switch is actuated, and means to render said first and second motors inoperative in response to actuation of said fourth switch.

9. In combination, a device, first and second electric motors for driving said device, first and second control switches, means for effecting operation of said first motor to drive said device upon the initial actuation of said first switch, means for effecting operation of said second motor to drive said device upon the second actuation of said first switch, means for effecting increase in the speed of said second motor in response to said second or subsequent actuation of said first switch, means for rendering said first motor ineffective to drive said device when said second motor is operating above a predetermined speed, means for effecting decrease in the speed of said second motor upon actuation of said second switch, means for rendering said first motor effective to drive said device when said second motor is operating below said predetermined speed, and means for rendering said second motor ineffective to drive said device upon subsequent actuation of said second switch when said second motor is operating at a speed below said predetermined speed.

10. The combination according to claim 9 including means for temporarily rendering said control switches ineffective to perform further control functions in the event that the second actuation of said first switch fails to effect operation of said second motor before said first motor is rendered ineffective to drive said device.

11. The combination according to claim 10 including means for indicating whether said switches have been temporarily rendered ineffective to perform further control functions and means for rendering said switches effective to again perform further control functions.

12. The combination according to claim 11 including third and fourth control switches, means for effecting operation of said first motor for as long as said third control switch is actuated, and means to render said first and second motors inoperative in response to actuation of said fourth control switch.

13. In combination, a device, first and second electric motors for driving said device, a control switch, means for effecting operation of said first motor to drive said device upon the initial actuation of said control switch, means for effecting operation of said second motor to drive said device upon the second actuation of said control switch, and means for effecting increase in the speed of said second motor in response to the second or subsequent actuation of said control switch.

14. The combination according to claim 13 including means for effecting decrease in the speed of said second motor and for rendering said second motor inoperative.

15. In combination, a device, first and second electric motors for driving said device, a control switch, means for effecting decrease in the speed of said second motor when the latter is in operation in response to operation of said control switch, and means for effecting operation of said first motor to drive said device in response to a subsequent operation of said control switch when said second motor is operating at a predetermined low speed.

16. The combination according to claim 15 including means for effecting increases in the speed of said second motor and for rendering said second motor inoperative.

References Cited in the file of this patent

UNITED STATES PATENTS

| | | |
|---|---|---|
| 629,952 | Clatworthy | Aug. 1, 1899 |
| 2,379,072 | Feldhausen | June 26, 1945 |